June 11, 1940.  F. R. CHESTER  2,203,672
POWER DRIVEN LIQUEFIER
Filed Nov. 14, 1938  2 Sheets-Sheet 1
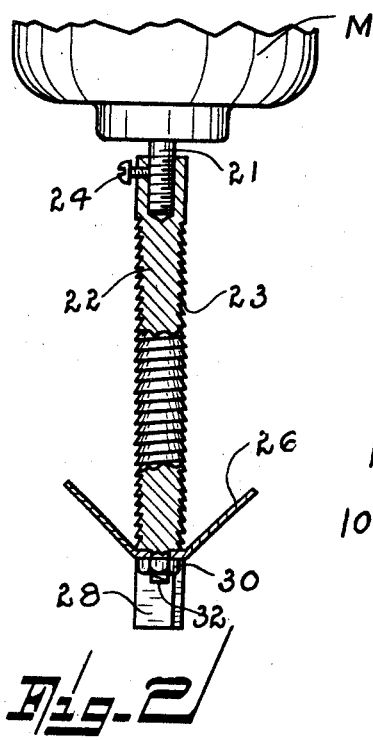
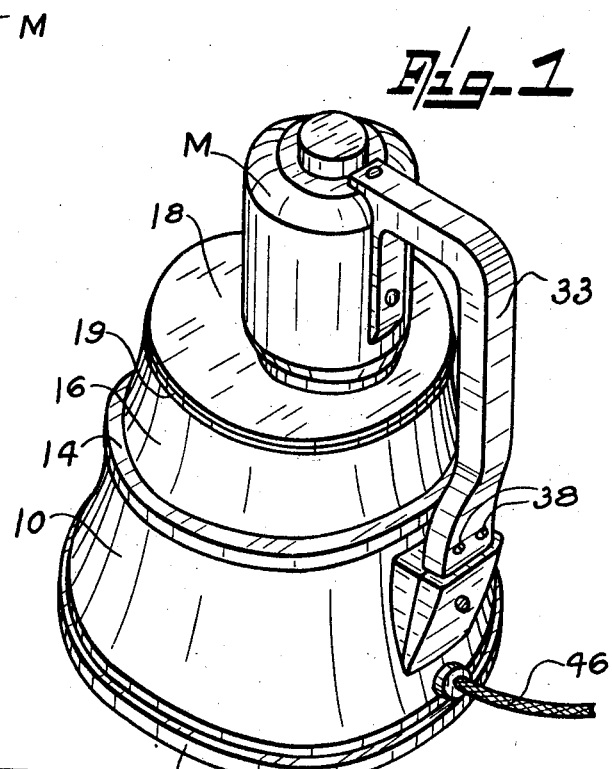
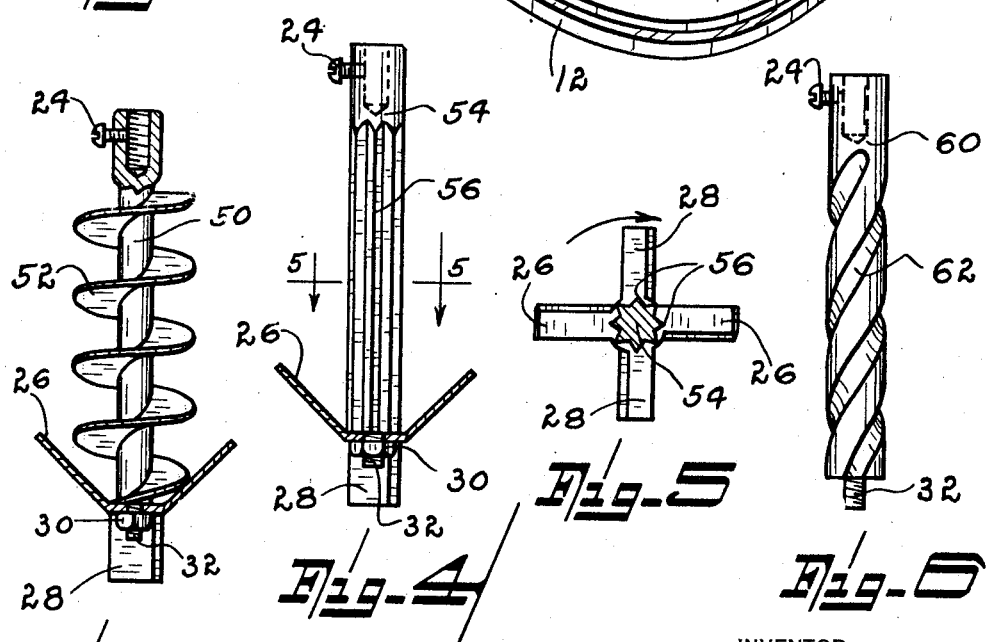
INVENTOR
Frank R. Chester
BY
Smith & Tusk
ATTORNEYS

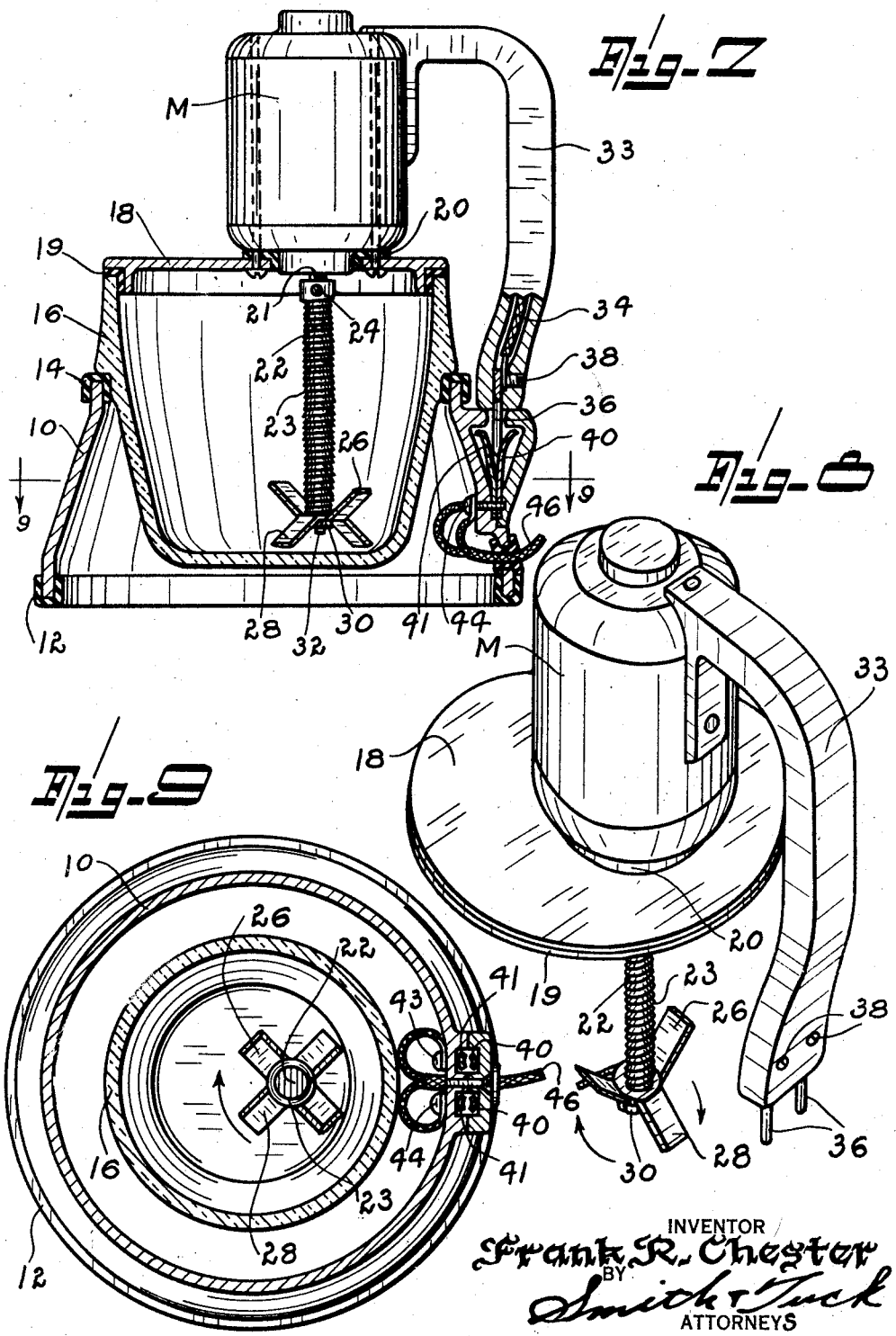

Patented June 11, 1940

2,203,672

UNITED STATES PATENT OFFICE 2,203,672

POWER DRIVEN LIQUEFIER

Frank R. Chester, Seattle, Wash., assignor to Frank R. Chester Corporation, Seattle, Wash., a corporation of Washington Application November 14, 1938, Serial No. 240,371

3 Claims. (Cl. 146—68)

My present invention relates to power equipment for kitchens and more particularly to a power driven liquefier.

There has been a very marked increase in the national consumption of liquid food. At first the products consisted of the vegetable and fruit juices which could be easily extracted; first among these being cider and tomato juice, and various other juices particularly of those fruits and vegetables having a weak, cellular structure. Investigation and trial have proved that many other foods are more easily assimilated when reduced to a liquid state; among these are the more woody vegetables such as spinach, carrots, parsnips, celery, and the like. Also it has been found possible to liquefy various other food products such as meats, nuts, and certain of the more pulpy fruits such as figs, in the dry form, and other dry fruits.

My device consists essentially of a rotor adapted to be driven at a very high speed of up to 20,000 or 30,000 revolutions a minute and to supply the same as a unit with a bowl in which is disposed a small cutting knife arranged to give a slight propeller action and which, as it is revolved at high speed, will reduce the food product to particles so infinitesimally small as to be carried in suspension in a liquid which is liberated when the tiny cell structures are fully broken down. It has been found that it is difficult to prevent the bridging of materials and, to circulate this material when the rotor is driven at extremely high speed, I have provided means for forcing the broken and cut material down the rotor shaft so that it comes into contact with the cutting knife so that a continuous flow of material is assured in the cutting bowl which ultimately results in reducing all the material to the very tiny particles that will remain in suspension in liquid. The action in this process, due to the extremely high speed of the cutter, may be likened to the beating of pulverizers used to reduce grain or wood particles to flour.

The principal object of my present invention is to provide means which will create a continuous flow of material past a plurality of high speed cutting knives so that very tiny particles will be formed of the food products treated.

Another important object of my present invention is to provide means whereby the rotor shaft will be so arranged as to force the materials, which may tend to bridge or pile up about the shaft, downwardly to the cutting blades.

A further object of my present invention is to so construct my liquefier that operation will not commence until the bowl is sealed and the knife is fully enclosed in the bowl to the end that no one can be injured by the knives revolving as they do at such extreme speed.

Other and more specific objects will be apparent from the following description taken in connection with the accompanying drawings, wherein Figure 1 is a perspective drawing showing my machine in its assembled form ready for use.

Figure 2 is an elevation showing the propelling motor in fragmentary form and showing the cutter shaft partly in section to better illustrate its construction.

Figures 3, 4, and 6 illustrate in elevation, partly in section, alternate arrangements of my rotor shaft.

Figure 5 is a cross-sectional view taken along the line 5—5 of Figure 4.

Figure 7 is a vertical, sectional view through my liquefier showing the essential parts in their true operating relationship.

Figure 8 is a perspective view showing the motor, the cover for the bowl, the rotor shaft, the cutter and the electric current contact points, employed in my device.

Figure 9 is a cross-sectional view taken along the line 9—9 of Figure 7.

Referring to the drawings, throughout which like reference characters indicate like parts, 10 designates the base of my device. This may be formed of any suitable material, preferably a dielectric material. I have illustrated the same as having flaring sides so as to provide a base of reasonably wide extent and an upper margin of lesser extent. On the lower edge of the base member I employ, preferably, a rubber ring 12 so as to cushion the same and on the upper end a similar rubber ring 14 to be used as a cushioning means for bowl 16. The bowl, I normally prefer to form of transparent glass preferably of the heat resisting type, although any suitable material may be used. When clear glass is used, however, it affords an opportunity to inspect the progress of the liquefication. Adapted to rest on the upper margin of bowl 16 is a cover member 18; this I prefer to provide with a downwardly extending annular flange and to rest the same on a rubber gasket 19. In this manner the electric motor M which is preferably secured to cover 18 is cushioned from the table or other support by the three rubber cushioning rings 12, 14, and 19 and to futher carry out this cushion effect I have provided a fourth cushioning ring 20 as a motor support. Cushioning of the motor is very desirable in that it operates at very high speed and unless deadening material is used there would be a tendency to set up relatively high frequency vibrations which would be most objectionable.

The motor shaft 21 is preferably threaded so as to accommodate the cutter shaft 22. Some suitable keying means may be employed as 24, however, when so employed care must be taken to maintain the equipment in proper balance. This can normally be best done by providing that the rotating unit will be dynamically balanced.

Shaft 22 is provided with a thread 23 so arranged with respect to motor M that it will tend to propel any materials adjacent it downwardly into the cutting knives. These knives are probably best shown in Figures 2, 5, and 8, and consist preferably of two cross members as 26 and 28 secured to the threaded end of shaft 22 designated at 32 so that a clamping nut 30 may be employed to secure the knives in place.

Secured to motor M is a handle 33. This I make hollow and preferably of dielectric material such as any of the various moldable plastics so as to form a channel for the conductor cable 34. The two wires of this cable terminate to contact points 36 and connection is made between these points and the separate wires of cable 34 by means of suitable screws 38. The electric service connection is then made from prongs 36 to the spring contactors 40 and 41 which in turn are connected through screws 43 and 44 to the separate wires of the supply conductor cable 46. In my present drawings I have assumed that base 10 and handle 33 will be of dielectric material. If other materials are used it will of course be necessary to provide effective insulation means as is common in all electric devices.

In Figure 3 I have illustrated a modified form of shaft at 50 having the same motor connection as previously described and the same knife assembly and securing means therefor; the propelling action, however, of the shaft following the same principles as shaft 22 is affected by means of a helical member 52 which is formed on shaft 50 and arranged as before so that the rotation of the motor will force the material in the bowl down into the knife assembly 26—28.

In Figure 4 I have illustrated shaft 54 as fluted at 56 and as probably more fully illustrated in Figure 5. It being found that with certain materials an undesirable bridging occurs around the shaft and the fluting shown serves as a milling cutter to cut the bridging materials away until it will pass by the shaft, start circulating again and eventually to cause them to settle down into the cutting knives.

In Figure 6 I have illustrated a still further modified shaft 60. This is normally provided with a plurality of spiral grooves 62 so as to create a shaft much after the construction of a machine drill. This again particularly where liquids are used or in the handling of materials that have a large percentage of liquids produces a very desirable downwardly directed stream in the immediate vicinity of the shaft.

Method of operation

In operating my device the usual method is to place in bowl 16 the amount of material which will normally make the required amount of liquid, adding sufficient liquid in the form of water, juices, oils, or eggs to produce the consistency or dilution desired to make a palatable drink. Where the materials are of a character that freely give up their juices which is true of virtually all raw fruits and vegetables, the cover 18 with the motor shaft and cutters are lowered into the bowl and as soon as electrical contact is made the shaft revolves at high speed. And in this connection it is desired to point out that the machine should be capable of speed up to twenty thousand revolutions a minute and possibly, if higher speed motors are available, even higher speed may advantageously be used. It has been found that as soon as the knives reduce a limited amount of fruit or vegetable to pulp that the juices liberated assist in the circulation of materials. It will be noted that the cutter shaft is eccentrically placed with respect to bowl 16 this is best illustrated in Figures 7 and 9 and as the shaft tends to propel materials down in the direction of knives 26 and 28 there will be a circulattion of materials down along the shaft and then up the side of the bowl farthermost removed from the cutter. This continuous flow assists in a thorough comminuting of the material; then just as broken grain is further pulverized into flour or sawdust may be further pulverized into wood flour, the fruit or vegetable is reduced to such tiny particles as to be virtually invisible to the unaided eye and are so fine that they produce in effect a colloidal solution in which all sense of pulp is lost and the resultant product is a smooth, easily assimilated food drink.

In addition to vegetables and fruits it has been found that other items can be similarly handled in this device. Particularly is this true of meats, peanuts, walnuts, filberts, and other nuts of similar character. In some instances the amount of juice or oil liberated is limited, and it is desirable as with certain of the dried fruits and with the woody vegetables to add a small amount of suitable liquid. In the case of vegetables and fruits, water is the normal liquid to use, in that water is the liquid liberated by them and a limited amount mixed with the juices would be unnoticed; in the case of certain nuts water may also be used; in other instances it may be desirable to use the natural oils liberated by the nuts or a neutral oil which will be easily absorbed by the materials and intermingled with the oil liberated.

A desirable feature of this device is that it is possible to place vegetables, fruits, meats, nuts, or other foods in the bowl, add a predetermined amount of liquid, put the cutter unit in place and then without any further attention a very palatable drink will be produced in from one to three minutes. If a mixed drink is desired it is only necessary to use the basic ingredients in the proper proportions and the cutters will not only liquefy the mass but will also very thoroughly mix the same.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

I claim:

1. In a power operated liquefier, the combination with a bowl, a removable bowl-lid and means forming an airtight joint between the lid and bowl, a motor mounted on the exterior of the lid and having its shaft depending into the bowl, and means forming an air-tight joint between the motor and the lid, of a rotor mounted on the shaft and depending into the bowl, a helical conveyer mounted on the exterior of the rotor for directing material downwardly, and a cruciform cutter mounted on the lower end of the rotor comprising a pair of upwardly diverging knives, and a pair of diametrically arranged downwardly diverging knives.

2. In a comminuting apparatus, an open-topped bowl for receiving given quantities of solids and liquid, a cover for preventing the contents from splashing out of the bowl, a power driven cutter shaft extending downwardly into the bowl to one side of the vertical center of the bowl and adjacent a side wall thereof and having cutting means comprising blades radiating from a lower portion of the shaft adjacent the bottom of the bowl and in proximity to the side wall of the bowl, and helically conveying means on the shaft and rotating therewith for directing the contents of the bowl downwardly to the cutting means, the rotation of said cutting means centrifugally swirling the contents of the bowl away from the cutting means along the wall of the bowl in a stream and back to said cutting means so that said cutting means may progressively comminute the solids into minute particles in the liquid at said cutting zone.

3. In a comminuting apparatus, an open-topped bowl for receiving given quantities of solids and liquid, a cover for preventing the contents from splashing out of the bowl, a power driven cutter shaft extending downwardly into the bowl to one side of the vertical center of the bowl and adjacent a side wall thereof and having cutting means comprising blades radiating from a lower portion of the shaft adjacent the bottom of the bowl and in proximity to the side wall of the bowl, and helically conveying means on the shaft and rotating therewith for directing the contents of the bowl downwardly to the cutting means, the rotation of said cutting means centrifugally swirling the contents of the bowl away from the cutting means along the wall of the bowl in a stream and back to said cutting means so that said cutting means may progressively comminute the solids into minute particles in the liquid at said cutting zone, said cover having a rubber seal with the rim of the bowl to provide a substantially air-tight seal.

FRANK R. CHESTER.